(12) United States Patent
Schreter

(10) Patent No.: US 8,650,583 B2
(45) Date of Patent: *Feb. 11, 2014

(54) SELECTIVELY TRANSMITTING TRANSACTION DATA

(75) Inventor: Ivan Schreter, Leimen (DE)

(73) Assignee: SAP AG, Walldorf (DE)

( * ) Notice: Subject to any disclaimer, the term of this patent is extended or adjusted under 35 U.S.C. 154(b) by 865 days.

This patent is subject to a terminal disclaimer.

(21) Appl. No.: 12/758,712

(22) Filed: Apr. 12, 2010

(65) Prior Publication Data

US 2010/0198785 A1   Aug. 5, 2010

Related U.S. Application Data

(63) Continuation of application No. 11/188,232, filed on Jul. 21, 2005, now Pat. No. 7,698,712.

(51) Int. Cl.
*G06F 3/00* (2006.01)
*G06F 11/00* (2006.01)

(52) U.S. Cl.
USPC .......................................... 719/318; 714/100

(58) Field of Classification Search
USPC ........................................................ 719/318
See application file for complete search history.

(56) References Cited

U.S. PATENT DOCUMENTS

| | | | |
|---|---|---|---|
| 7,421,430 B2 * | 9/2008 | Meng | 1/1 |
| 2003/0023657 A1 * | 1/2003 | Fischer et al. | 709/102 |
| 2005/0037787 A1 * | 2/2005 | Bachner et al. | 455/502 |
| 2005/0073982 A1 * | 4/2005 | Corneille et al. | 370/338 |
| 2005/0198087 A1 * | 9/2005 | Bremers | 707/204 |
| 2012/0005530 A1 * | 1/2012 | Marathe et al. | 714/19 |

OTHER PUBLICATIONS

Show-Jane Yen, An Efficient data Mining Technique for Discovering interesting Sequential Patterns, 2001.*

* cited by examiner

*Primary Examiner* — Lechi Truong
(74) *Attorney, Agent, or Firm* — Mintz, Levin, Cohn, Ferris, Glovsky and Popeo, P.C.

(57) ABSTRACT

A last transaction for a business object may be identified. Transactions related to that occur prior to the last transaction and subsequent to a last upload event are associated with the last transaction. Data describing the last transaction and the associated transactions may be transmitted over a communications network. Related apparatuses, techniques, systems, computer program products are also described.

16 Claims, 5 Drawing Sheets

SELECTIVELY TRANSMITTING TRANSACTION DATA

CROSS REFERENCE TO RELATED APPLICATION[S]

This application is a continuation and claims the benefit of priority under 35 U.S.C. §120 of U.S. patent application Ser. No. 11/188,232, filed Jul. 21, 2005, entitled "SELECTIVELY TRANSMITTING TRANSACTION DATA," now U.S. Pat. No. 7,698,712, the disclosure of which is incorporated herein by reference.

TECHNICAL FIELD

The subject matter described herein relates to selectively transmitting transaction data.

BACKGROUND

Mobile communications devices, such as personal digital assistants, smart phones, and the like which are not normally connected to a communications network often require periodic synchronization of business data with a central data repository (or one or more data repositories, systems, etc.). Such synchronization typically involves the download of data from the central data repository and the upload of either all business data from the mobile communications device or all business data associated with transactions that occurred subsequent to a last synchronization.

In some circumstances, the need may arise to only selectively synchronize or upload data. For example, a sales representative that typically synchronizes his personal digital assistant with a central data repository using a LAN connection, may obtain an urgent sales order while visiting a client. In order to ensure the order is rapidly processed, the sales representative may connect his personal digital assistant to the central data repository using a mobile phone or another bandwidth limited conduit. However, with conventional arrangements, all modifications since a previous synchronization operation are typically transmitted to the central data repository. As a result, information not germane to the sales order is also transmitted thereby increasing bandwidth consumption and an amount of time to process the sales order.

SUMMARY

In one aspect, a computer-implemented method may identify a last transaction for a business object. Transactions related to the last transaction occurring prior to the last transaction and subsequent to a last upload event for the business object may be associated with the last transaction. Subsequently, data describing the last transaction and the associated transactions may be transmitted over a communications network.

In some variations, a unique identifier may be assigned to each transaction. The identifiers may be assigned sequentially or in some other manner that allows them to be distinguished by their chronological occurrences. For each business object, a last (or most recent) transaction may be appended to an instance of the business object.

The transmission of data may comprise transmitting at least one message for each of the last transaction and the associated transaction identifying changes made since the last upload event. The messages may be, for example, XML documents identifying changes to the business object. In addition, a table may be generated that includes at least one field for the assigned transaction identifier and one or more messages describing the associated transaction. Such an arrangement allows for the rapid acquisition of data characterizing the various transactions from a last upload event.

Related preceding transactions occurring subsequent to the last upload event (for the business object) may be determined for each of the last transaction and the associated transactions. An order may then be determined in which to transmit data associated with each of the last transaction and the associated transactions based on the determined related preceding transactions. Optionally, or in the alternative, each of the last transaction and associated transactions may be ranked so that data associated each of such transactions is transmitted subsequent to a corresponding determined related preceding transaction (e.g., transaction data may be transmitted in a chronological order for each business object).

In an interrelated aspect, a plurality of transactions occurring subsequent to a last upload event may be associated with a plurality of business objects. Thereafter, data requesting an upload of data for a subset of the plurality of business objects may be requested. In response to the request, data describing transactions associated with the subset of the plurality of business objects and any related preceding transactions occurring subsequent to the last upload event may be transmitted over a communications network.

In some variations, each business object having at least one transaction subsequent to an upload event may be displayed (e.g., via a graphical user interface on a mobile device, etc.). The subset of the plurality of business objects may be selected based on this display. Optionally, a last transaction for each of the subset of the plurality of business objects may determined as well as related preceding transactions for each of the determined last transactions.

In still a further interrelated aspect, a mobile communication device may store data associated with transactions for plurality of business objects. A request may be received by the mobile device to upload data for a subset of the plurality of business objects. Data describing a last transaction and any preceding related transactions occurring subsequent to a last upload event may be sent to a server over a communications network. In some variations, the data may be sent according to a chronological transaction order for each business object.

In another aspect, an apparatus may comprise an identification unit, an association unit, and a transmitter. The identification unit may be operable to identify a last transaction for a business object. The association unit may be operable to associate transactions related to the last transaction occurring prior to the last transaction and subsequent to a last upload event for the business object with the business object. The transmitter may be operable to transmit data characterizing the last transaction and the associated transactions over a communications network. Optionally, the apparatus may include or be coupled to a data repository that stores data describing the transactions.

In yet another interrelated aspect, an apparatus (e.g., a mobile communications device periodically coupled to a communications network) may comprise an association unit, a receiver, and a transmitter. The association unit may be operable to associate a plurality of transactions with a plurality of business objects. The receiver may be operable to receive data requesting an upload of data for a subset of the plurality of business objects. The transmitter may be operable to transmit data describing transactions associated with the subset of the plurality of business objects occurring subsequent to a last upload event over a communications network.

Computer program products, which may be embodied on computer readable-material, are also described. Such computer program products may include executable instructions that cause a computer system to conduct one or more of the method acts described herein.

Similarly, systems are also described that may include a processor and a memory coupled to the processor. The memory may encode one or more programs that cause the processor to perform one or more of the method acts described herein.

The subject matter described herein provides many advantages. For example, the current subject matter allows for the rapid and selective transmission and/or upload of data. Moreover, the current subject matter provides an arrangement that obviates the need for processing intensive parsing and synchronization operations.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various figures indicate like elements.

DETAILED DESCRIPTION

Figure 1:
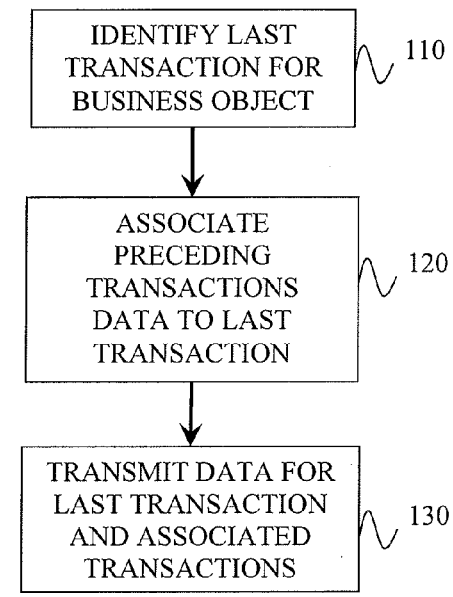
FIG. 1 is a process flow diagram of a method for selectively transmitting transaction data.

FIG. 1 illustrates a process flow diagram of a method 100 that, at step 110, identifies a last transaction for a business object. The business object represents a physical or logical object of significance to a business. In the insurance industry, business objects may include, for example, a business transaction, a contract, a policy, a customer, a coverage indicator, a risk indicator, and the like. Data for transactions that occurred prior to the last transaction and subsequent to a last upload event for the business object are, at step 120, associated with the last transaction. Data describing the last transaction and the associated transactions are transmitted, at step 130, over a communications network.

Figure 2:
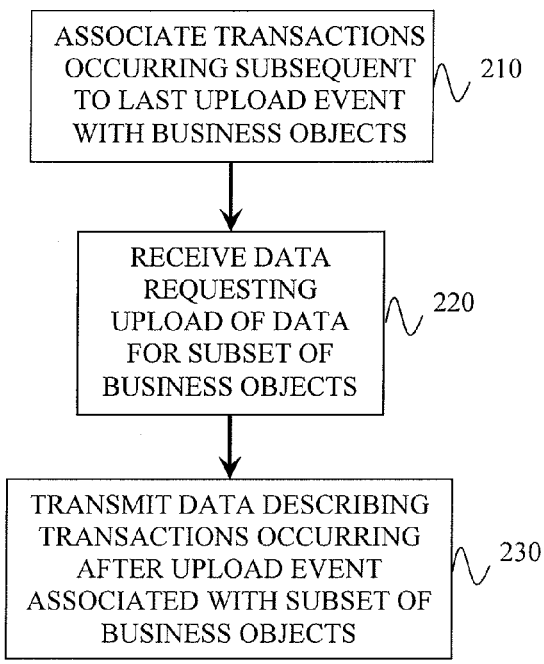
FIG. 2 is a schematic diagram of an apparatus operable to selectively transmit transaction data.

FIG. 2 illustrates a process flow diagram of a method 200 that is interrelated to the method 100 of FIG. 1 and which, at step 210, associates a plurality of transactions with a plurality of business objects. Data requesting an upload of data for a subset of the plurality of business objects is, at step 220, received. Thereafter, at step 230, data describing transactions associated with the subset of the plurality of business objects occurring subsequent to a last load event is transmitted over a communications network.

Figure 3:
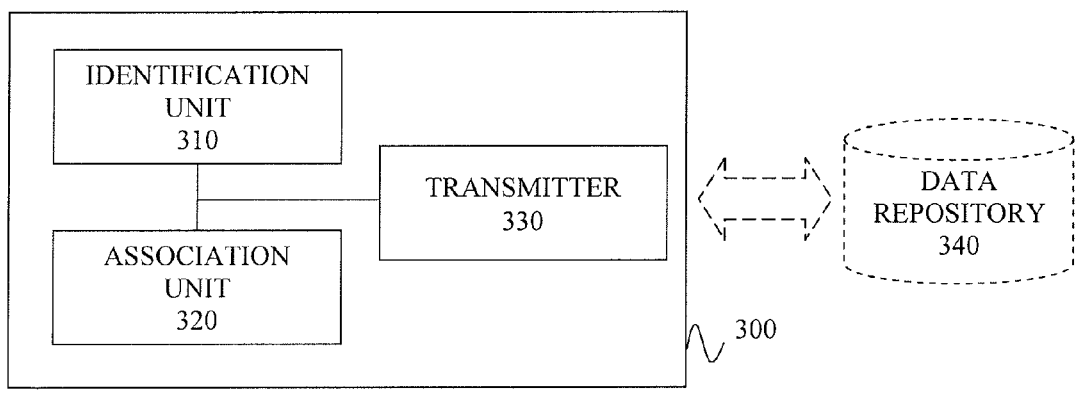
FIG. 3 is a process flow diagram of a method for selectively transmitting transaction data interrelated to the method of FIG. 1.

FIG. 3 illustrates an apparatus 300 that comprises an identification unit 310, an association unit 320, and a transmitter 330. The identification unit 310 is operable to identify a last transaction for a business object (e.g., sales order, update of contact information, e-mail, etc.). The association unit 320 is operable to associate transactions related to the last transaction occurring prior to the last transaction and subsequent to a last upload event for the business object with the last transaction. The transmitter 330 is operable to transmit data characterizing the last transaction and the associated transactions over a communications network. In some variations, the apparatus 300 includes or is coupled to a data repository 340 that may, for example, store data associated with the business objects and/or transactions.

Figure 4:
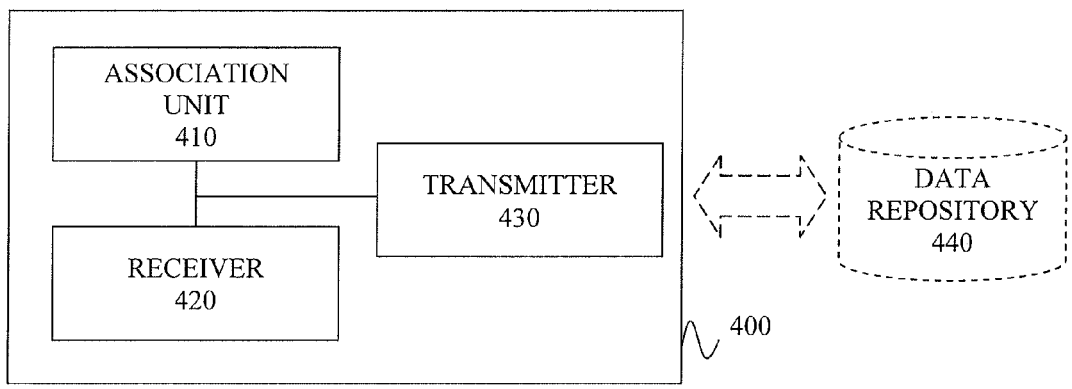
FIG. 4 is a schematic diagram of an apparatus operable to selectively transmit transaction data interrelated to the apparatus of FIG. 2.

FIG. 4 illustrates an apparatus 400 that comprises an association unit 410, a receiver 420, and a transmitter 430. The association unit 410 is operable to associate a plurality of transactions with a plurality of business objects. The receiver 420 is operable to receive data requesting an upload of data for a subset of the plurality of business objects. The transmitter 430 is operable to transmit data describing transactions for the subset of business objects occurring subsequent to a last upload event over a communications network. In some variations, the apparatus 400 includes or is coupled to a data repository 440 that may, for example, store data associated with the business objects and/or transactions.

The following provides information useful for understanding and implementing the subject matter described herein as well as optional variations that may be implemented singly or in combination depending on the desired configuration.

Figure 5:
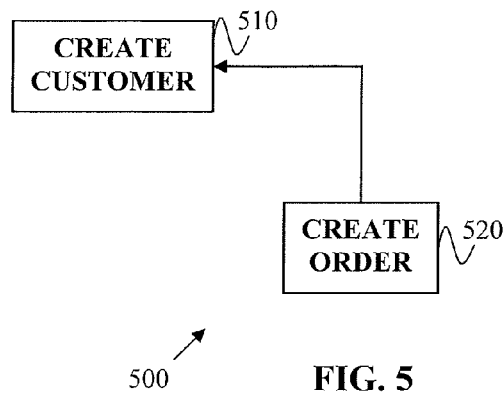
FIG. 5 illustrates is a first transaction dependency graph useful for understanding and implementing the subject matter described herein.

FIG. 5 illustrates a transaction dependency graph 500 in which a first transaction 510 creates a new customer object and a second transaction 520 creates a new order for this customer. In this case, the second transaction 520 is dependent on the first transaction 510 (which precedes the second transaction 520). Such a dependency may be created when modification in a transaction references a business object changed in another transaction. In this case, modification/creation of the order for the customer 520 will reference a modification/creation of a customer object 530 in another transaction.

Figure 6:
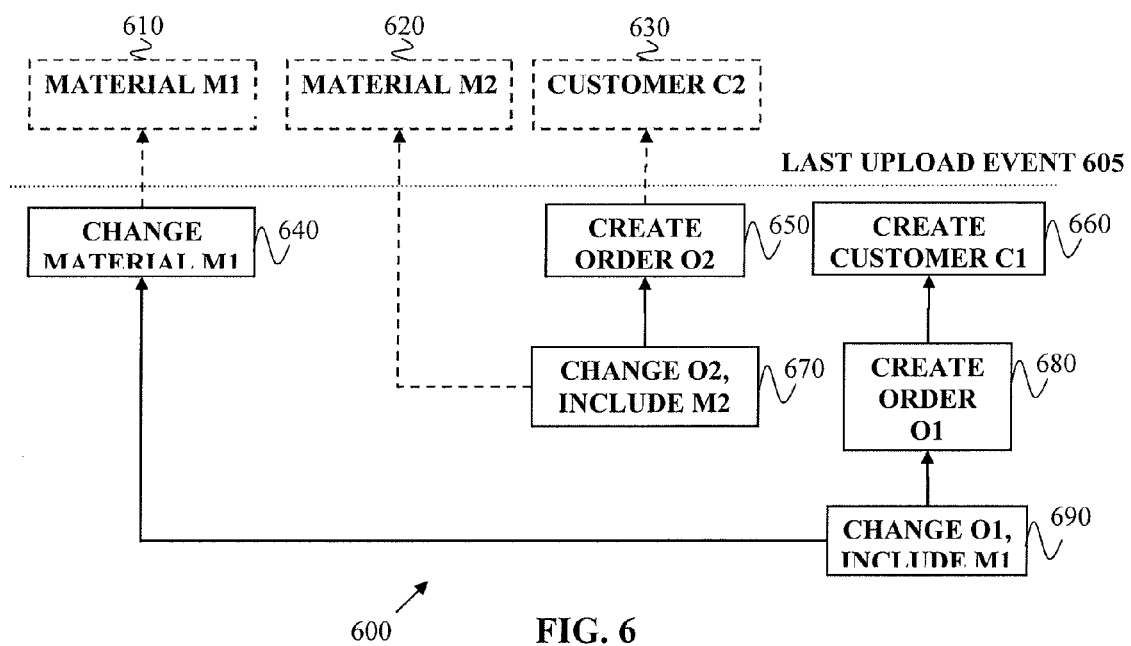
FIG. 6 illustrates is a second transaction dependency graph useful for understanding and implementing the subject matter described herein.

FIG. 6 illustrates a transaction dependency graph 600 in which business objects material M1 610, material M2 620, and customer C1 630 have been generated prior to a last upload event 605. The last upload event 605 represents the point at which a mobile device last uploaded transaction data via a communications network to a remote server (e.g., middleware server). The mobile device may be hardwired to a communications network (e.g., a LAN, etc.) or it may communicate wirelessly (e.g., WAP, etc.).

In FIG. 6, several transactions occur subsequent to the last upload event 605. A Material M1 transaction 640 changes a material M1, a customer C1 transaction 660 creates C1, an order O1 transaction 680 references customer C1 660, an order O2 transaction 650 references customer C2 630, an order O1 transaction 690 includes a line item referencing material M1 610, and an order O2 transaction 670 includes a line item referencing material M2 620. As the dependency graph 600 of FIG. 6 is a directed acyclic graph, the edges of the graph define topological ordering of the transactions. For any possible topological ordering of transactions in dependency order, the resulting data store may be updated in a consistent manner.

Figure 7:
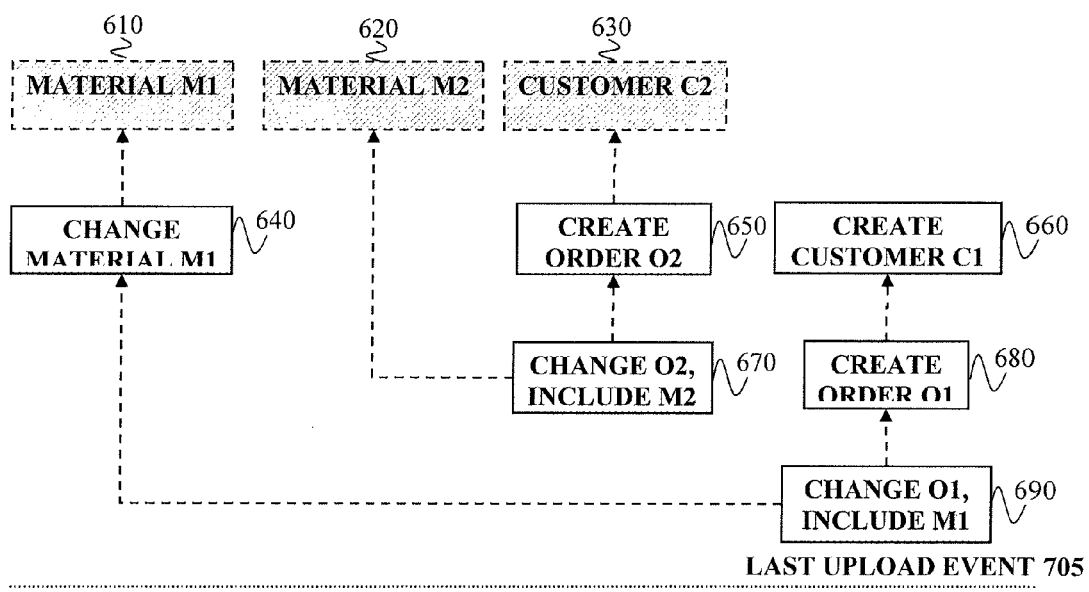
FIG. 7 illustrates is a third transaction dependency graph useful for understanding and implementing the subject matter described herein.

FIG. 7 illustrates a dependency graph 700 in which all transaction data was synchronized as part of a last upload event 705. In other words, data describing all transactions that occurred subsequent to the last upload event 605 of FIG. 6 was sent to the middleware server. Therefore, after the full upload, there are no open transactions that must be uploaded to the middleware server.

Figure 8:
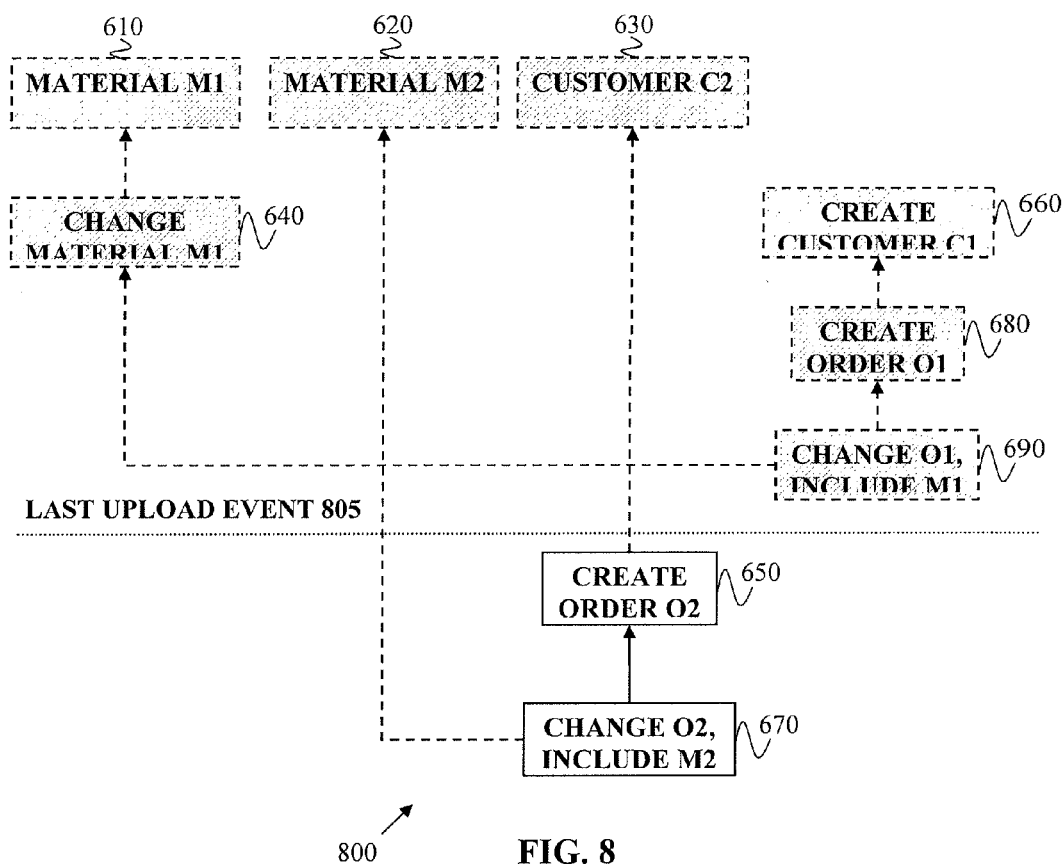
FIG. 8 illustrates is a fourth transaction dependency graph useful for understanding and implementing the subject matter described herein.

With reference to FIG. 8, a dependency graph 800 is illustrated in which only certain transactions 640, 660, 680, 690 related to order O1 have been selectively uploaded to a middleware server since the last upload event 605 of FIG. 6. Other transactions 650, 670 which do not pertain to order O1 have not been sent to the middleware server.

In order to selective upload transaction data pertaining to order O1, the last transaction relating to order O1 may be determined, which in this case, is the change O1, include material M1 transaction 690. Thereafter, all reachable vertices from the change O1 transaction 690 on the graph 600 of FIG. 6 must be computed. In this case, the reachable vertices include the change material M1 transaction 640, the create order C1 transaction 680, and the create customer C1 transaction 660. The computation of the reachable vertices, may for example, cease when discovering a preceding related transaction for which data associated with the transaction has already been uploaded (as indicated by dashed lines in FIGS. 6-8). Therefore, in order to effectuate the selective/partial upload of data relating to order O1, data relating to four transactions 640, 660, 680, 690 may be transmitted over a communications network to, for example, a middleware server.

The order in which data associated with the transactions 640, 660, 680, 690 is transmitted may take into account whether such transactions are dependent on other transactions or whether they are independent. Independent transactions may be sent in any order. Dependent transactions may be sent in an order such that each transaction transmitted does not have any related preceding transactions. With the transaction dependency graph 600 of FIG. 6, there are three manners in which data associated with the transactions may be transmitted (corresponding to all possible topological orderings of the vertices in the graph 600):

change M1 transaction 640→create C1 transaction 660→create O1 transaction 680→change O1 transaction 690 create C1 transaction 660→change M1 transaction 640→create O1 transaction 680→change O1 transaction 690 create C1 transaction 660→create O1 transaction 680→change M1 transaction 640→change O1 transaction 690

The selection of which of these three sequences to use when transmitting may take into account, for example, variables such as transaction timestamp or reverse order of discovering dependencies when computing reachable vertices in the dependency graph 600, and the like.

In order to support the aforementioned operations, data structures for holding the dependencies must be defined. There are several ways of defining the dependencies with various ratios between memory usage and execution speed.

For each executed transaction, a message may be created when the transaction ends (just before database commit). In one variation, the message may be an XML document representing and/or identifying the changes within the transaction. These messages may be sent to the middleware server so that they may be applied to a server database. Each transaction may be assigned a transaction ID, which may be a number, alphanumeric string or other unique identifier. In some variations, the transaction IDs are sequential.

A message table may be defined as comprising two fields: a transaction ID (a number), and message text (an XML document inside of a BLOB). Optionally, the message table may comprise additional fields such as data relating to flow control, conflict and error handling, and the like. A message may be entered into the message table when committing the transaction locally on the mobile device.

For the purposes of full synchronization (full upload), all messages in the message table may be sequentially sent based on their respective transaction ID. With selective upload of transaction data relating to a certain business object, an ID of the last changing transaction that changed the business object may be stored in an instance of the business object. The special instance field containing the last transaction identification may be used to selectively upload data associated with the business object. In some variations, each instance of a business object may have an additional field, such as last_change_tx, which contains a transaction ID of the last changing transaction.

While a transaction is running, transaction IDs for preceding transactions from which the running transaction depends (i.e., related preceding transaction) may be collected. To do so, for each modified business object, the last changing transaction ID (which is stored in the instance itself) may be added to the set of related preceding transactions. Additionally, for a reference field change (e.g., when assigning a customer to an order), a last changing transaction ID of the target business object may also be added to the set.

When a transaction finishes, a set of transaction IDs, from which the current transaction depends have been collected. This set may, for example, be stored persistently. In one variation, another field is added to a message table such that it contains fields for transaction ID (a number), message text (an XML document inside of a Binary Large Object (BLOB)), and list of transaction IDs for related preceding transactions (i.e., those transactions from which a subsequent transaction depends).

One variation for computing a set of reachable vertices of a directed acyclic graph representing transaction dependencies starting from a certain transaction ID (or a set of transaction IDs) associates a mark with each transaction ID which indicates that the reachable vertices have been calculated. A sample algorithm for this approach, reproduced below, may start with a set pre-filled with unmarked IDs of "starting point" business objects (e.g., ID of order to transmit transaction data).

```
while set contains unmarked IDs do
    for each unmarked ID in set do
        mark ID
        select dependent IDs of current ID
            from message table
        add all dependent IDs not contained in the set
            to the set (as unmarked)
    done
done
```

Such an algorithm may produce a set of transaction IDs corresponding to a set of reachable vertices in the graph starting from vertex (vertices) corresponding to transaction ID(s) to be sent. This computed set of transaction IDs may comprise the set of all transaction IDs which need to be transmitted including all dependencies/related preceding transactions. In some variations, transaction IDs that have already been sent to the middleware server are preferably filtered out (and not transmitted). Data associated with selected transactions (e.g., messages) may then be sent in a sequential order based on transaction IDs which are based on topological ordering.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method comprising:
processing a business object with a mobile computing device, the business object representing a physical or logical object of significance to a business; and
synchronizing, using the mobile computing device, data related to the business object between the mobile device and a central data repository by:
identifying a last transaction for the business object processed by the mobile device;
associating transactions for the business object occurring prior to the last transaction and subsequent to a last upload event with the last transaction;
appending, by the mobile computing device, the last transaction for the business object to an instance of the business object; and
transmitting data characterizing the last transaction and the associated transactions over a communications network to the central data repository;
wherein each transaction includes a unique transaction identifier;
wherein the unique transaction identifiers are assigned to the transactions sequentially.

2. A method as in claim 1, wherein the transmitting data comprises: transmitting at least one message for each of the last transaction and the associated transaction, the message identifying changes made since the last upload event.

3. A method as in claim 2, wherein the message is an XML document identifying changes to the business object.

4. A method as in claim 1, further comprising: generating, by the mobile computing device, a table having at least one field containing the unique transaction identifier and an associated message describing the transaction.

5. A method as in claim 1, further comprising: determining, by the mobile computing device, related preceding transactions for each of the last transaction and the associated transactions.

6. A method as in claim 5, further comprising: determining, by the mobile computing device, an order in which to transmit data associated with each of the last transaction and the associated transactions based on the determined related preceding transactions.

7. A method as in claim 5, further comprising: ranking, by the mobile computing device, each of the last transaction and associated transactions so that data associated therewith is transmitted subsequent to a corresponding determined related preceding transaction.

8. A method as in claim 1, further comprising: displaying, by the mobile computing device, each business object having at least one transaction subsequent to an upload event on a graphical user interface.

9. A mobile communications device comprising:
a communications interface for connecting with a communications network;
and one or more processors comprising:
processing unit for processing a business object received over the communications network; the business object representing a physical or logical object of significance to a business; and
an identification unit to identify a last transaction for the business object; and
an association unit to associate transactions occurring prior to the last transaction and subsequent to a last upload event for the business object with the last transaction and to append the last transaction for the business object to an instance of the business object; and a transmitter to transmit data characterizing the last transaction and the associated transactions over the communications network to a central data repository for synchronization of the data with data at the central data repository, wherein each transaction includes a unique transaction identifier;

wherein the unique transaction identifiers are assigned to the transactions sequentially.

10. A device as in claim 9, further comprising a storage device having a data repository coupled to the association unit to store data describing the transactions.

11. A device as in claim 9, the one or more processors further comprising: an assignation unit to assign a sequential transaction identifier to each transaction.

12. A device as in claim 9, the one or more processors further comprising a prioritization unit to determine an order in which data associated with each transaction is transmitted by the transmitter.

13. A device as in claim 9, wherein the transmitter transmits at least one message describing changes made to at least one business object during each of the last transaction and the associated transactions.

14. A method executed by one or more processors, the method comprising:

associating, by the one or more processors, a plurality of transactions with at least one business object of a plurality of business objects; the business object representing a physical or logical object of significance to a business; and identify a last transaction for the business object;

receiving, by the one or more processors, instructions requesting an upload of data for the at least one business object; and associating transactions for the business object occurring prior to the last transaction and subsequent to a last upload event with the last transaction;

transmitting, by the one or more processors and using a dependency graph, data describing the associated transactions associated with the at least one business object over a communications network to a central data repository for synchronization of the data with data at the central data repository, the dependency graph being a directed acyclic graph having edges defining a topological ordering of a plurality of transactions;

wherein each transaction includes a unique transaction identifier;

wherein the unique transaction identifiers are assigned to the transactions sequentially.

15. A method as in claim 14, further comprising: displaying, by the one or more processors via a graphical user interface, each of the at least one business objects having an associated transaction subsequent to the last upload event.

16. A method as in claim 14, further comprising:

determining, by the one or more processors, a last transaction for the at least one business object; and determining, by the one or more processors, related preceding transactions for each of the determined last transactions.

* * * * *